Patented Oct. 6, 1936

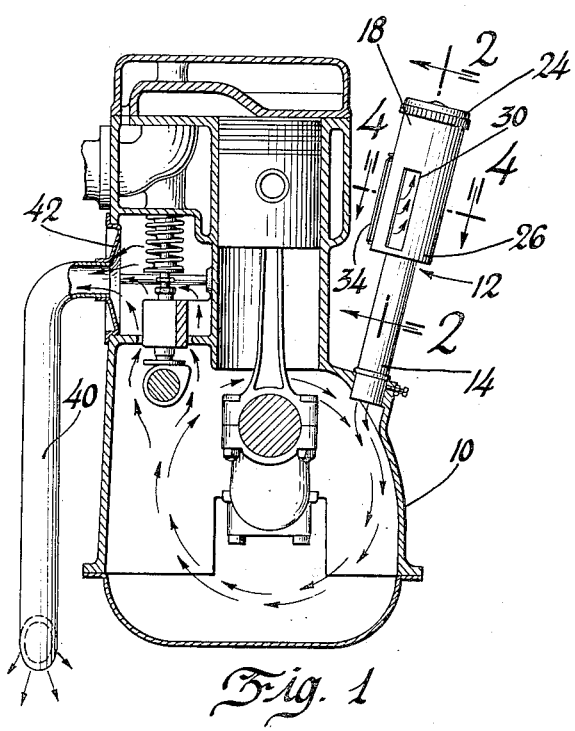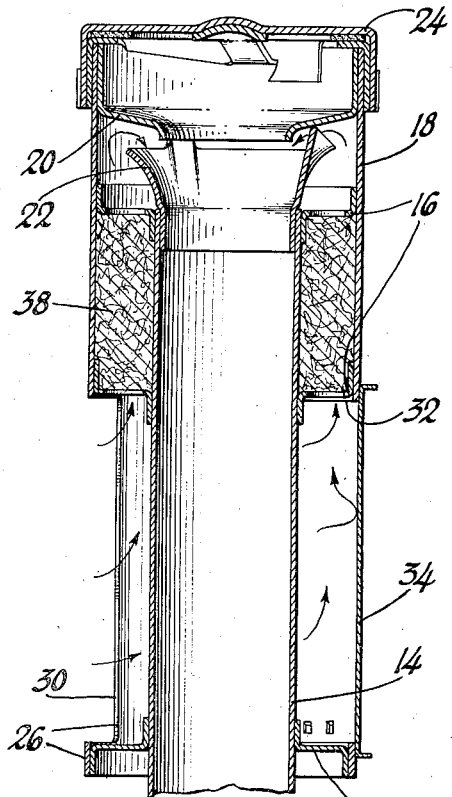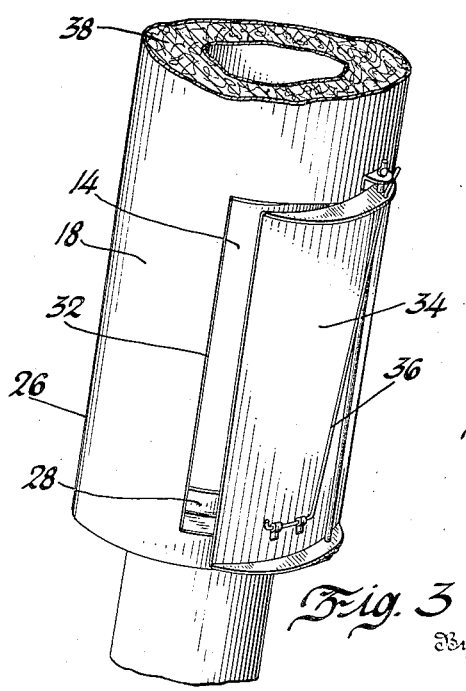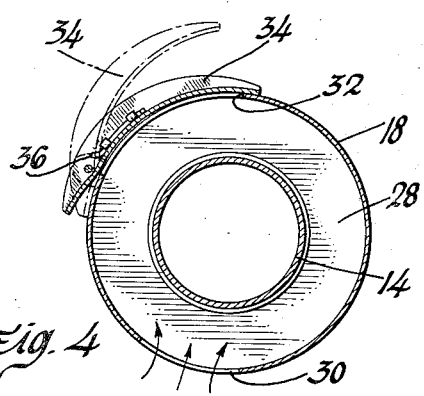

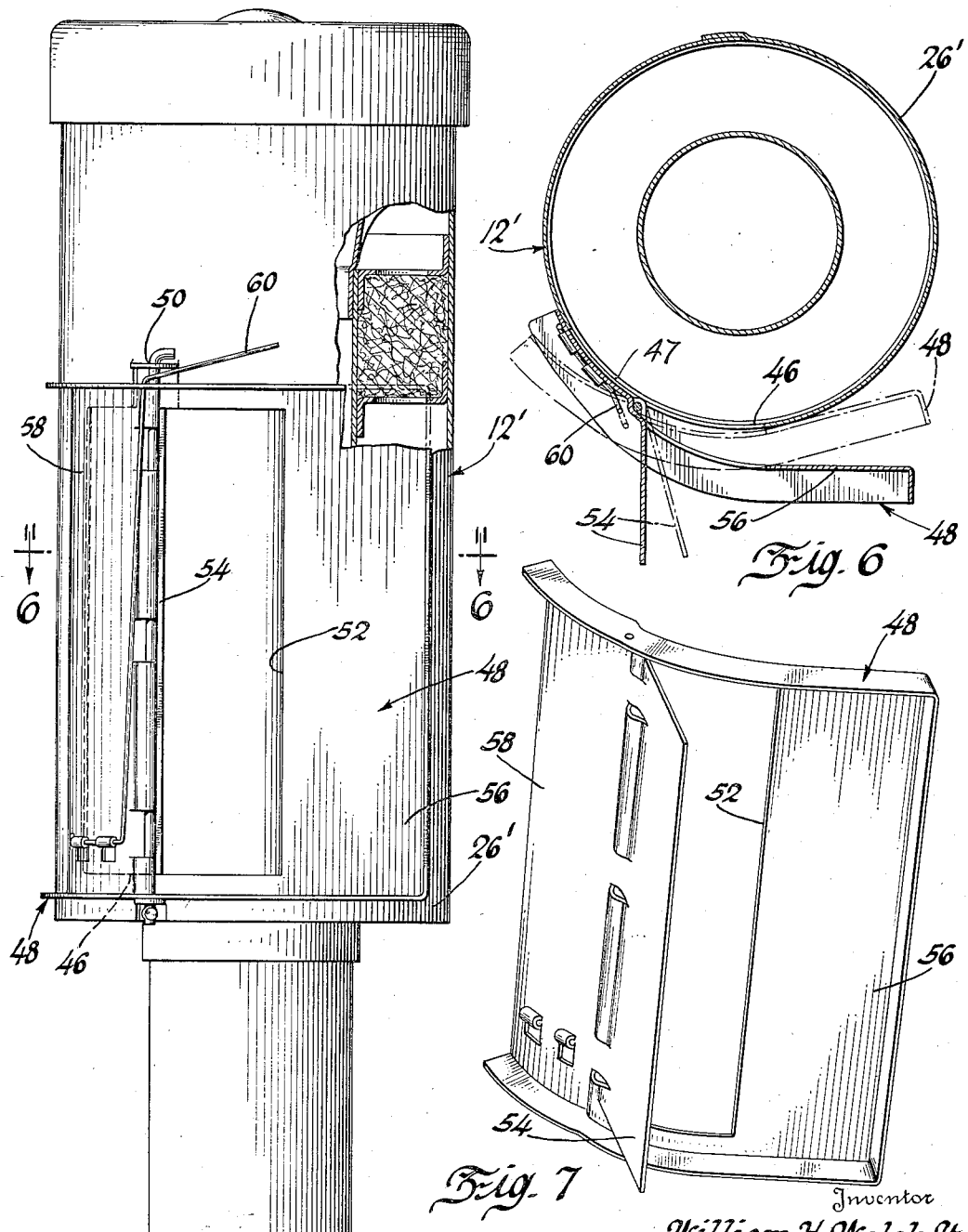

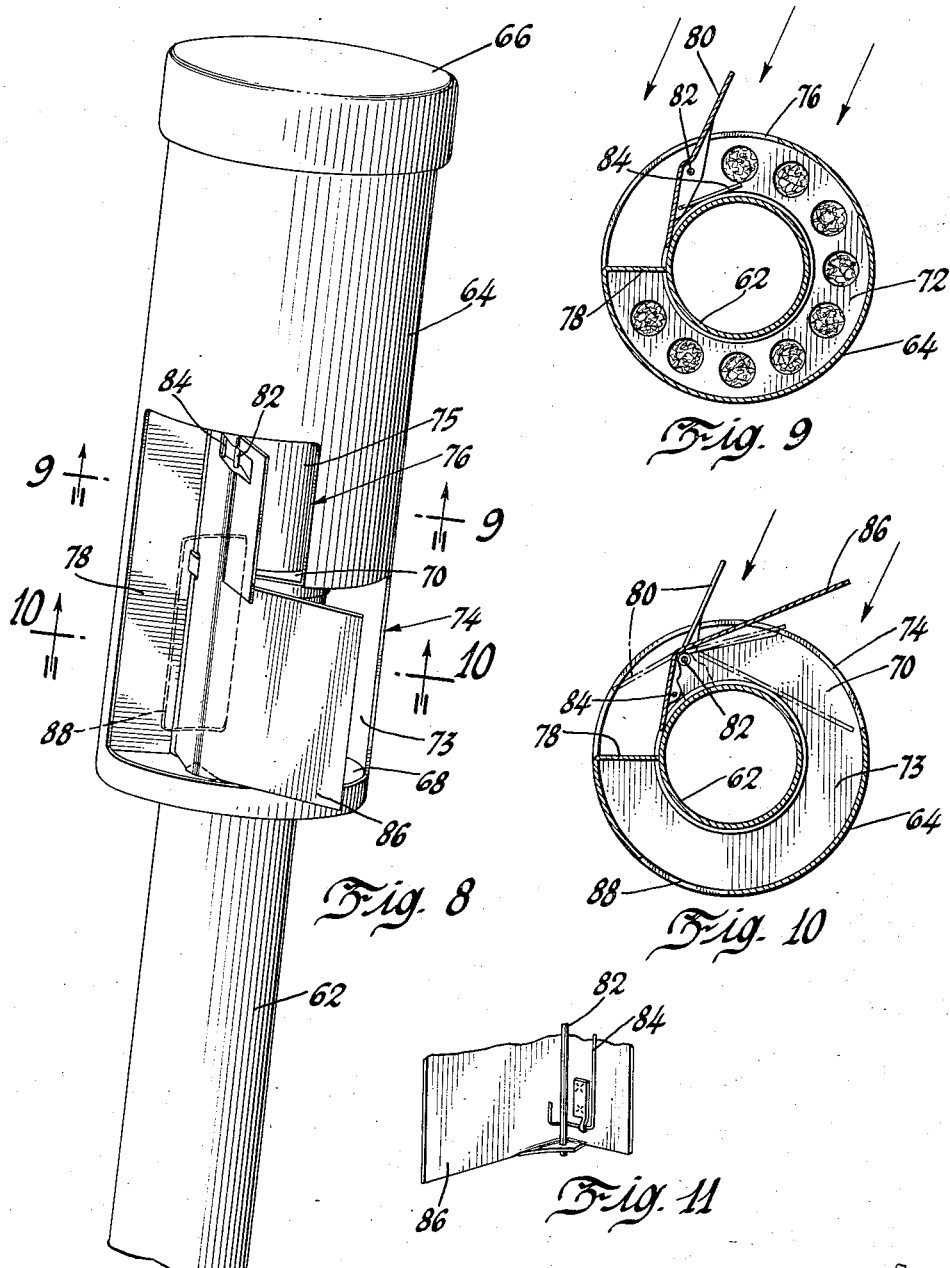

2,056,755

UNITED STATES PATENT OFFICE 2,056,755

CONTROL FOR CRANKCASE VENTILATION

William H. Welch, Jr., Pontiac, Mich., assignor to General Motors Corporation, Detroit, Mich., a corporation of Delaware Application September 21, 1934, Serial No. 744,885

10 Claims. (Cl. 123—171)

This invention has to do primarily with a method of controlling the ventilation of engine crankcases although it may find use in other fields.

It is customary in the design of automobile engines to make provision for flow of air through the crankcase to remove by evaporation diluents such as water and fuel which enter the lubricating oil reservoir by leakage past the piston rings. To produce the necessary flow it is common to use air under pressure from the usual cooling fan or to apply suction to the crankcase employing either the usual engine intake suction, or suction from an exhaust operated venturi, or the suction obtained by extending the crankcase air outlet pipe to a point where it is subject to the aspirating effect of the air flowing past the traveling car. In all such arrangements there is a possibility that at certain speeds too much air may pass through the crankcase and take out the oil mist with it, causing an excessive consumption of lubricating oil. There is here disclosed a simple arrangement for controlling the flow so as to prevent excessive ventilation.

The improvement is preferably incorporated in a ventilating system of the type disclosed and claimed in the prior patent of Taylor No. 1,761,944, granted June 3, 1930, in which the crankcase is provided with an intake conduit the upper end of which is surrounded by a jacket provided with a suitable closure, preferably made removable so that the conduit may also be used to introduce oil into the crankcase. In the upper end of the jacket is arranged a filter to remove dirt from the entering air. The lower end of the jacket is closed and in the side wall near the bottom an opening is provided for the admission of air. This opening faces the blast from the usual cooling fan, and the entering air passes upwardly through the filtering material and then down into the intake conduit. According to the present invention the amount of air entering the crankcase is controlled by a valve suitably located in the lower end of the jacket. In one form of the invention the valve controls an auxiliary air discharge opening in the rear of the bottom portion of the jacket and on the opposite side from the fan so that when the air pressure becomes excessive the valve is swung open and air is discharged through the rear of the jacket without entering the crankcase. In another form of the invention the air admission opening and an auxiliary air discharge opening are arranged adjacent each other, being separated only by the pivotal mounting of a valve which controls both, restricting inflow and increasing the size of the outflow passage. In another form of the invention the vane which actuates the valve operates in a separate air passage provided by a continuation of the jacket.

In the drawings:

Figure 1 is a vertical section through an automobile engine showing the invention applied thereto.

Figure 2 is a section on line 2—2 of Figure 1.

Figure 3 is a rear view in perspective of the crankcase intake showing the control valve.

Figure 4 is a section on line 4—4 of Figure 1.

Figure 5 is a front view of a modified form of control valve.

Figure 6 is a section on line 6—6 of Figure 5.

Figure 7 is a perspective view of the valve of Figures 5 and 6.

Figure 8 is a front view in perspective of a modified form of cankcase inlet.

Figures 9 and 10 are sections on the corresponding lines of Figure 8.

Figure 11 is a detail of the bottom of the valve of Figure 8 looking from the inside.

Referring to Figure 1, 10 indicates the crankcase, and 12 the crankcase intake. As shown in detail in Figure 2, the intake consists essentially of a conduit 14 fastened in the crankcase. To the upper end of the conduit is secured by perforated partitions 16 a jacket 18. In the upper end of the jacket is secured a funnel 20 which serves to direct oil into the conduit 14 through a second funnel member 22 secured within the upper end of the conduit. 24 indicates a cap of any suitable type which may be used to close the upper end of the casing 18 and may be readily removed to permit pouring oil into the crankcase.

26 indicates the lower portion of the jacket 18 which is held spaced from conduit 14 by annular disc 28. The portion 26 of the jacket is provided with an air admission opening 30 on the side toward the front of the engine, receives air under pressure from the usual cooling fan. Portion 26 is likewise provided toward the rear with an auxiliary air discharge opening 32 normally closed by pivoted valve 34, the valve being yieldingly pressed to this position by spring 36 or other suitable means. It will be observed that the space between the perforated partitions 16 is filled with filtering-material 38, preferably in the form of copper mesh, but any other suitable material may be employed.

40 indicates the air outlet pipe for the crankcase, the pipe being mounted on the cover 42 of the valve compartment, preferably on the side of the engine opposite the air intake 12.

The device operates as follows: Air under pressure from the fan enters the air intake 12 through the aperture 30 and passes upwardly through the perforated partitions and the filtering material 38, and passes down between the funnel members 20—22 into the conduit 14 and thence into the crankcase. It may here be subject to the entraining action of the revolving crankshaft and then passes out through the space about the valve guides as shown, into the valve chamber and out through pipe 40, discharging beneath the vehicle. It will be noted that the lower open end of pipe 40 faces rearwardly so as to be subject to the aspirating action of the air stream below the car.

Should the pressure of air in the portion 26 of the air intake become too great, valve 34 will be swung open as indicated by the dotted line showing in Figure 4, permitting some of the air to be returned to the atmosphere. The air pressure is thus reduced, preventing the passage of excessive quantities into the crankcase. While the port 32 is shown discharging air into the atmosphere and is so claimed, it will be understood that this expression is used only to designate the discharge of air into some other place than the crankcase intake. It will be noted that the passages 30 and 32 are arranged to one side of the axis of the intake so as to permit the bypassing action of the valve 34 to be more effective.

With this arrangement it has been found possible to prevent the flow of air through the crankcase from exceeding a desirable amount regardless of operating conditions of the car. Thus in one installation it was found desirable and possible to restrict flow to a value not exceeding 5 cubic feet per minute, whereas with the same installation, except for the omission of the valve 34 and its port, the flow at times became as high as 10 cubic feet per minute.

In Figures 5 to 7 there is shown a further modification of the construction. Here the portion 26' of the jacket of the crankcase inlet 12' is provided with air admission opening 46 and an auxiliary air discharge opening 47 arranged adjacent each other but separated by the pivotal mounting 50 of valve 48, shown in Figure 7. Valve 48 is provided with an opening 52 in line with the opening 46, formed by bending out a vane portion 54, and with a vane portion 56 lying along the housing 26'. Valve 48 normally occupies a position in which the vane portion 58 closes the opening 47, being urged to that position by spring 60.

In the operation of this form of the invention as the pressure of the air increases the vane portions 54 and 56 are engaged by the entering air with sufficient force to swing the valve to the dotted line position at which time the auxiliary air discharge opening 47 is opened to the atmosphere. It will be noted that in this movement the valve 48 functions as an unbalanced valve, for the portion 58 is acted upon by the wind in the same manner as the vane portions 54 and 56, but tends to oppose the opening of the valve.

It will also be noted that the part 54 acts to some extent to restrict admission of air to the crankcase intake.

In the modification shown in Figures 8 to 11, 62 indicates the intake conduit, and 64 the jacket provided with the removable cover 66 as in the previous forms of the invention. The jacket 64 is spaced from the conduit 62 by means of partitions 68, 70 and 72. There is also another partition corresponding to partition 72 and similarly apertured just as shown in Figures 2 and 5, and the space between the perforated partitions is filled with filtering material. Partitions 68 and 70 define a chamber 73 having an opening 74 therein on the side facing the fan blast, and partitions 70 and 72 define a chamber 75 having a smaller opening 76 therein, the opening 76 being alined on one side with the opening 74. 78 indicates a portion of the jacket 64 which is pressed inwardly to engage the conduit 62. 80 indicates a valve mounted on pivot 82 journaled in partitions 68 and 72. The valve 80 is normally biased by spring 84 to hold it in open position in which the right hand portion of the aperture 76, as viewed in Figure 8, is opened to receive air under pressure from the fan as indicated by the arrows in Figure 9. Preferably formed as a continuation of the valve 80 is vane 86 which, as shown in Figure 10, is likewise subject to the action of the fan blast. The chamber 73 is provided with an outlet 88 on the side away from the fan blast.

The arrangement shown in Figures 8 to 11 operates as follows: Spring 84 normally holds valve 80 and vane 86 in outermost positions, as shown in full lines in Figures 9 and 10, so that there is the least interference with flow of air into the chamber 75 and thence through the filtering material and conduit 62 into the crankcase. As the air pressure increases the valve 80 is swung to closed position as shown in dotted lines in Figure 10, this action taking place largely because of the action of the air on the vane 86. It will be noted that the vane 86 substantially shuts off flow of air through the chamber 73. The advantage of providing the separate vane 86 and the opening 88 resides in the fact that by properly shaping the vane 86 and by using the proper size opening at 88, any desired variation of ventilation with air pressure may be easily attained.

It will be obvious that other means than a spring may be used to urge the pressure control valve to bypassing position, this being simply one mechanical means for accomplishing the purpose.

I claim:

1. The combination with an engine having a crankcase and the usual means for directing a cooling air stream along the engine, an intake conduit for said crankcase, a jacket surrounding the upper end of said conduit and spaced therefrom, a closure for the upper end of said jacket, said closure being spaced from the conduit, a closure for the bottom of said jacket, said jacket being provided adjacent the bottom thereof with an air admission port facing the air stream and with a port opening into the atmosphere, and a spring biassed valve mounted on the jacket and adapted to control the flow of air through said ports.

2. The combination with an engine having a crankcase and the usual means for directing a cooling air stream along the engine, an intake conduit for said crankcase, a jacket surrounding the upper end of said conduit and spaced therefrom, a closure for the upper end of said jacket, said closure being spaced from the conduit, a closure for the bottom of said jacket, said jacket being provided adjacent the bottom thereof with an air admission port facing the air stream and with a port opening into the atmosphere, and a spring biassed valve mounted on the jacket and adapted to control the flow of air through said ports, the portion of the jacket above said valve being filled with filtering material.

3. The combination with an engine having a crankcase and the usual means for directing a cooling air stream along the engine, an intake conduit for said crankcase, a jacket surrounding the upper end of said conduit and spaced therefrom, a closure for the upper end of said jacket, said closure being spaced from the conduit, a closure for the bottom of said jacket, said jacket being provided with an air admission port adjacent the bottom thereof facing the air stream, and with a port opening into the atmosphere and means operated by pressure of the entering air controlling the flow of air through said ports.

4. In crankcase ventilating system the combination of a crankcase, an air intake for the crankcase arranged to receive air under pressure and direct it into the crankcase, said intake being provided with an auxiliary air outlet, and means controlled by the pressure of air entering the intake adapted to return to the atmosphere through said auxiliary air outlet some of the air entering the intake.

5. In a crankcase ventilating system the combination of a crankcase having an air intake and an air outlet, a conduit connected to the air intake having an air admission opening and an auxiliary air discharge opening, a valve pivoted to said conduit and having a portion closing said auxiliary air discharge opening, and yieldable means for biasing said valve toward outlet closing position.

6. In a crankcase ventilating system the combination of a crankcase having an air intake and an air outlet, a conduit connected to the air intake having an air admission opening and an auxiliary air discharge opening, a valve pivoted to said conduit and having a portion closing said auxiliary air discharge opening, yieldable means for biasing said valve toward outlet closing position, said valve having a vane portion extending in the path of the entering air.

7. In a crankcase ventilating system the combination of a crankcase having an air intake and an air outlet, a conduit connected to the air intake having an air admission opening and an auxiliary air discharge opening, a valve pivoted to said conduit and having an opening alined with said air admission opening and having a portion closing said auxiliary air discharge opening, and yieldable means for biasing said valve toward outlet closing position.

8. In a crankcase ventilating system the combination of a crankcase having an air intake and an air outlet, a conduit connected to the air intake having an air admission opening and an auxiliary air discharge opening, a valve pivoted to said conduit and having an opening alined with said air admission opening and having a portion closing said auxiliary air discharge opening, yieldable means for basing said valve toward outlet closing position, said valve having a vane portion extending in the path of flow of entering air.

9. An intake for crankcases and the like comprising a conduit, a jacket surrounding one end of said conduit, a closure for the end of the jacket, said closure being spaced from the conduit, a closure for the lower end of the jacket, spaced apertures in the jacket, and an air pressure controlled valve mounted on the jacket adjacent one of said apertures and arranged to control flow of air through said apertures.

10. An intake for crankcases and the like comprising a conduit, a jacket surrounding one end of said conduit, a closure for the end of the jacket, said closure being spaced from the conduit, a closure for the lower end of the jacket, spaced apertures in the jacket, an air pressure controlled valve mounted on the jacket adjacent one of said apertures and arranged to control flow of air through said apertures, spaced perforated partitions in said jacket above said apertures, and filtering material between said partitions.

WILLIAM H. WELCH, Jr.

CERTIFICATE OF CORRECTION.

Patent No. 2,056,755. October 6, 1936

WILLIAM H. WELCH, JR.

It is hereby certified that error appears in the printed specification o: the above numbered patent requiring correction as follows: Page 3, first column, line 21, claim 4, after the word "In" insert a; and second column, line 21, claim 8, for "basing" read biasing; and that the said Letters Pate should be read with these corrections therein that the same may conform to t record of the case in the Patent Office.

Signed and sealed this 15th day of December, A. D. 1936.

(Seal)

Henry Van Arsdale
Acting Commissioner of Patents.